United States Patent
Kassler

(10) Patent No.: US 12,197,528 B2
(45) Date of Patent: Jan. 14, 2025

(54) MEASURING THE READABILITY OF WEBSITE PAGES

(71) Applicant: Dell Products L.P., Round Rock, TX (US)

(72) Inventor: Max Kassler, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 17/862,498

(22) Filed: Jul. 12, 2022

(65) Prior Publication Data

US 2024/0020348 A1     Jan. 18, 2024

(51) Int. Cl.
G06F 16/957     (2019.01)
G06F 16/953     (2019.01)
G06F 16/958     (2019.01)

(52) U.S. Cl.
CPC ........ G06F 16/9577 (2019.01); G06F 16/953 (2019.01); G06F 16/986 (2019.01)

(58) Field of Classification Search
CPC ... G06F 16/9577; G06F 16/953; G06F 16/986
See application file for complete search history.

(56) References Cited

U.S. PATENT DOCUMENTS 6,289,304 B1 * 9/2001 Grefenstette ......... G06F 16/345
                                                                  715/236
2007/0130318 A1 * 6/2007 Roast .................... G06Q 10/10
                                                                  709/224
2015/0206169 A1 * 7/2015 Ye ....................... G06Q 30/0242
                                                                  705/14.41
2018/0074690 A1 * 3/2018 Zambetti ............. G06F 3/04847
2021/0271805 A1 * 9/2021 Comeau ................ G06F 40/154
2022/0188514 A1 * 6/2022 Thota .................... G06F 40/253

OTHER PUBLICATIONS

Bernard, Michael L., Chaparro, Barbara S., Mills, Melissa M., Halcomb, Charles G. (2003). Comparing the effects of text size and format on the readability of computer-displayed Times New Roman and Arial text, International Journal of Human-Computer Studies, 59 (6), 823-835.
Silver, N.Clayton, Braun, Curt C. (1993). Perceived readability of warning labels with varied font sizes and styles, Safety Science, 16 (5-6), 615-625.
Duchnicky, R. L., & Kolers, P. A. (1983). Readability of Text Scrolled on Visual Display Terminals as a Function of Window Size. Human Factors, 25(6), 683-692.
Hussain, W., Sohaib, O., Ahmed, A., Qasim Khan, M. (2011). Web readability factors affecting users of all ages. Australian Journal of Basic and Applied Sciences, 5(11), 972-977.

* cited by examiner

*Primary Examiner* — Sanchita Roy
(74) *Attorney, Agent, or Firm* — Krishnendu Gupta; Lesley Leonessa

(57) ABSTRACT

Methods, system, and non-transitory processor-readable storage medium for a website page density and readability system are provided herein. An example method includes capturing an image of a website page rendered in a web browser, where the image comprises text content and graphical content within the website page. The website page density and readability system determines a website page density associated with the website page by removing the text content from the image. The website page density and readability system determines a readability score associated with the website page using the website page density.

20 Claims, 12 Drawing Sheets

Width = 1484 pixels
Height = 1067 pixels
Total WebPage Area: 1583428 sq pixels
- - -
Number of Words: 131
Number of Graphics: 25
Number of Blocks: 20
- - -
Text Coverage: 180424 sq pixels ( 0.11394518727722384 % )
Graphics Coverage: 177728.5 sq pixels ( 0.11224286800536558 %)
- - -
Total Area Covered  358152.5  sq pixels ( 0.22618805528258942 %)
- - -
Graphics to Text Ratio:  0.9850601915487962
Num 3+: 57
Total Syl: 306
Ave Syl / Word: 2.33587786259542
- - -
KORI:  41. 096790735957654

FIG. 7

READABILITY SCORE = 28.89

Windows 10 Support

The Dell Windows 10 Support pages offer all the initial set up, troubleshooting and general information you need for the Window 10 Operating System. Operating system maintenance can be a daunting prospect. But these articles, videos and links to important Microsoft support pages ensure that you have all the resources you need to guide you through any queries or issues with the Win10 OS.

- Dell computers tested for upgrade to Windows 11
    - Get a list of Dell systems tested by our engineers for upgrade to Windows 11.
- Upgrade and Updates for Windows 10
    - All the information that you need including Windows 10 upgrade, update Windows 10, and more. Get help upgrading to Windows 10 on your Dell computer and find information about Dell computers and devices that are tested with Windows 10.
- Learn to use Windows 10
    - Find tutorials and How To knowledge base articles for getting started with Windows10.
- Troubleshoot Windows 10
    - Having problems with Windows 10 or Windows 10 not working? Review our Dell technical content for a solution.
- Dell systems tested for the latest version of Windows 10
    - Get the list of legacy Dell systems tested by our engineers with the latest version of Windows 10.

FIG. 8

READABILITY SCORE = 32.25

Windows 10 Support

The Dell Windows 10 Support pages offer all the initial set up, troubleshooting and general information you need for the Window 10 Operating System. Operating system maintenance can be a daunting prospect. But these articles, videos and links to important Microsoft support pages ensure that you have all the resources you need to guide you through any queries or issues with the Win10 OS.

Dell computers tested for upgrade to Windows 11
Get a list of Dell systems tested by our engineers for upgrade to Windows 11.

Upgrade and Updates for Windows 10
All the information that you need including Windows 10 upgrade, update Windows 10, and more. Get help upgrading to Windows 10 on your Dell computer and find information about Dell computers and devices that are tested with Windows 10.

Learn to use Windows 10
Find tutorials and How To knowledge base articles for getting started with Windows10.

Troubleshoot Windows 10
Having problems with Windows 10 or Windows 10 not working? Review our Dell technical content for a solution.

Dell systems tested for the latest version of Windows 10
Get the list of legacy Dell systems tested by our engineers with the latest version of Windows 10.

FIG. 9

MEASURING THE READABILITY OF WEBSITE PAGES

CROSS REFERENCE TO RELATED APPLICATIONS

This Application is related to co-pending U.S. patent application Ser. No. 17/862,509 entitled "AUTOMATING TEXT AND GRAPHICS COVERAGE ANALYSIS OF A WEBSITE PAGE" (Dell Docket No. 128559.01) both filed concurrently herewith, the teachings of which applications are hereby incorporated herein by reference in their entirety.

FIELD

The field relates generally to analyzing website pages, and more particularly to analyzing the text and graphics coverage of website pages to determine website page density and readability, in the form of a readability score, within information processing systems.

BACKGROUND

Determining what percentage of a website page is covered with textual content versus graphical content can provide valuable and comprehensive information to improve the analytics associated with the website page, and the user experience. Readability is an "ease of reading" metric. Historically, readability metrics were used to measure copy in textbooks for school use, newspapers, or training manuals.

SUMMARY

Illustrative embodiments provide techniques for implementing a website page density and readability system in a storage system. For example, illustrative embodiments capture an image of a website page rendered in a web browser. The website page density and readability system determines a text density associated with text content in the image, and then removes the text content from the image. The website page density and readability system determines a graphic density associated with graphic content in the image, and determines a website page density associated with the website page using the text density and graphic density. Other types of processing devices can be used in other embodiments. These and other illustrative embodiments include, without limitation, apparatus, systems, methods and processor-readable storage media.

Illustrative embodiments provide techniques for implementing a website page density and readability system in a storage system. For example, illustrative embodiments capture an image of a website page rendered in a web browser, where the image comprises text content and graphical content within the website page. The website page density and readability system determines a website page density associated with the website page by removing the text content from the image. The website page density and readability system determines a readability score associated with the website page using the website page density. Other types of processing devices can be used in other embodiments. These and other illustrative embodiments include, without limitation, apparatus, systems, methods and processor-readable storage media.

BRIEF DESCRIPTION OF THE DRAWINGS

FIG. 7 shows an example output of the website page density and readability system in an illustrative embodiment.

FIGS. 8 and 9 show example website pages where modification of content and layout affect the readability score in an illustrative embodiment.

DETAILED DESCRIPTION

Figure 1:
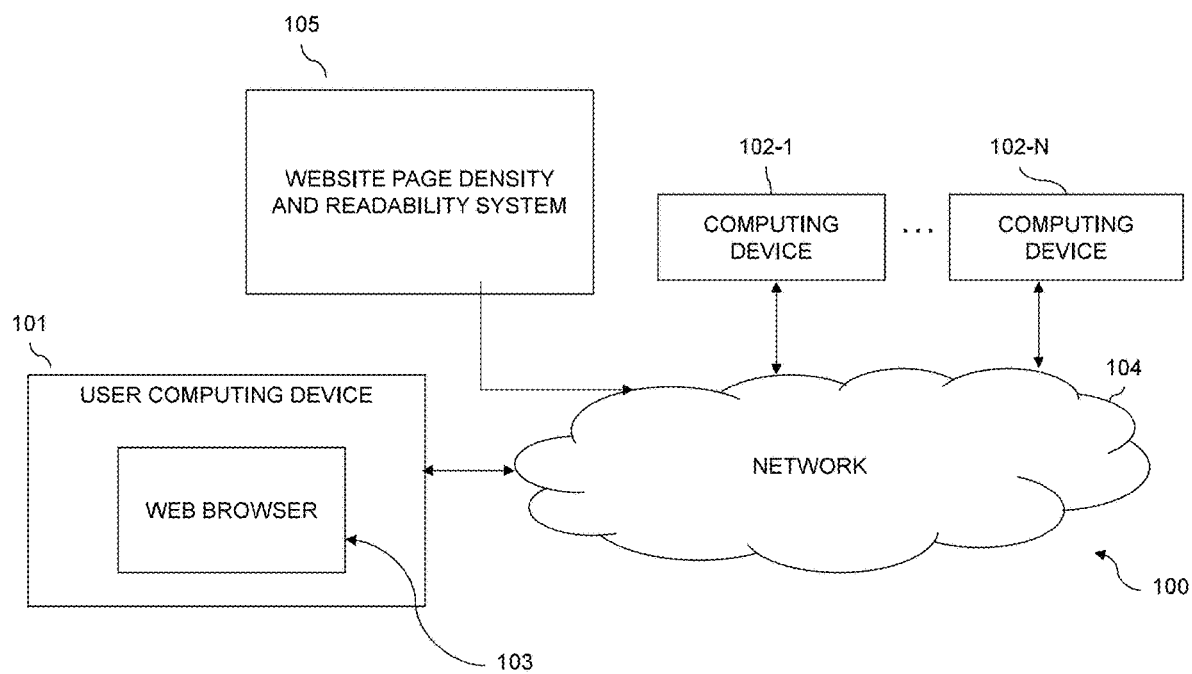
FIG. 1 shows an information processing system including a website page density and readability system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a website page density and readability system, which technique may be used to provide analysis of text density, graphics density, and website page readability by capturing an image of a website page rendered in a web browser. The website page density and readability system determines a text density associated with text content in the image, and then removes the text content from the image. The website page density and readability system determines a graphic density associated with graphic content in the image, and determines a website page density associated with the website page using the text density and graphic density.

Described below is a technique for use in implementing a website page density and readability system, which technique may be used to provide a readability score by capturing an image of a website page rendered in a web browser, where the image comprises text content and graphical content within the website page. The website page density and readability system determines a website page density associated with the website page by removing the text content from the image. The website page density and readability system determines a readability score associated with the website page using the website page density. Other types of processing devices can be used in other embodiments. These and other illustrative embodiments include, without limitation, apparatus, systems, methods and processor-readable storage media.

Conventional technologies for determining the area covered by textual and graphical elements on a website page are time-consuming and error prone. Conventional technologies provide inconsistent results since the boundaries of textual elements may be defined inconsistently, and there may be a degree of subjectivity when defining the area around graphical elements. Conventional technologies do not provide a total coverage area of both textual content and graphical content in square pixels. Conventional technologies do not use the area covered by textual and graphical elements on a website page to determine readability metrics. Conventional technologies for determining readability metrics do not take into consideration the cognitive impact of graphical and text density relative to the size of the reading area. Conventional technologies for determining readability do not take into account on-page attributes such as website page density. Conventional technologies for determining readability metrics assume a block of contiguous text is at least 100 words in length, which is not necessarily the case in an online medium, such as website pages. Conventional technologies for determining readability metrics fail to provide meaningful information for the text on website pages.

By contrast, in at least some implementations in accordance with the current technique as described herein, the area covered by textual and graphical elements is determined by capturing an image of a website page rendered in a web browser. The website page density and readability system determines a text density associated with text content in the image, and then removes the text content from the image. The website page density and readability system determines a graphic density associated with graphic content in the image, and determines a website page density associated with the website page using the text density and graphic density.

By contrast, in at least some implementations in accordance with the current technique as described herein, the readability score is determined by capturing an image of a website page rendered in a web browser, where the image comprises text content and graphical content within the website page. The website page density and readability system determines a website page density associated with the website page by removing the text content from the image. The website page density and readability system determines a readability score associated with the website page using the website page density. Other types of processing devices can be used in other embodiments.

Thus, a goal of the current technique is to provide a method and a system for providing a website page density and readability system that can determine the website page density. Another goal is to provide the total coverage area of both textual content and graphical content in square pixels. Another goal is to provide a readability metric that takes into consideration the cognitive impact of graphical and text density relative to the size of the reading area. Another goal is to provide a readability metric that takes into account on-page attributes such as website page density.

In at least some implementations in accordance with the current technique described herein, the use of a website page density and readability system can provide one or more of the following advantages: the website page density provides consistent results and avoids the problems with subjectivity regarding graphical elements on the website page, the readability score is not subject to the same types of prerequisites or limitations of other readability scores, such as a 100-word minimum word length, the readability score takes into account on-page attributes such as website page density, and the readability score avoids erroneous results produced by traditional print medium readability metrics applied to online mediums.

In contrast to conventional technologies, in at least some implementations in accordance with the current technique as described herein, website page density is determined by capturing an image of a website page rendered in a web browser. The website page density and readability system determines a text density associated with text content in the image, and then removes the text content from the image. The website page density and readability system determines a graphic density associated with graphic content in the image, and determines a website page density associated with the website page using the text density and graphic density.

In contrast to conventional technologies, in at least some implementations in accordance with the current technique as described herein, the readability score is determined by capturing an image of a website page rendered in a web browser, where the image comprises text content and graphical content within the website page. The website page density and readability system determines a website page density associated with the website page by removing the text content from the image. The website page density and readability system determines a readability score associated with the website page using the website page density. Other types of processing devices can be used in other embodiments.

In an example embodiment of the current technique, the website page density and readability system receives the image of the website page, and renders, as output of the website page density and readability system, a display comprising readability score associated with the website page, based on the website page density.

In an example embodiment of the current technique, the website page density and readability system tunes the readability score by modifying at least one of the text content and the graphic content on the website page.

In an example embodiment of the current technique, the website page density and readability system determines a number of words in the image, and a number of syllables per word, and calculates the readability score based on at least one of the number of words in the image, the number of words in the image having at least three syllables; and the website page density.

In an example embodiment of the current technique, the website page density and readability system multiplies the number of words in the image by the number of words in the image having at least three syllables by the website page density, and takes the square root of the multiplication.

In an example embodiment of the current technique, the website page density and readability system captures a bitmap image.

In an example embodiment of the current technique, the website page density and readability system analyzes the image to identify the text content of the website page.

In an example embodiment of the current technique, the website page density and readability system identifies each of a plurality of words rendered in the image.

In an example embodiment of the current technique, for each of the plurality of words rendered in the image, the website page density and readability system determines a bounding box associated with each word, calculates an area associated with the bounding box, and adds the area to a total word area associated with the image to obtain the text density.

In an example embodiment of the current technique, for each of a plurality of words rendered in the image, the website page density and readability system obtains bounding box coordinates associated with each word, and renders a background color on the image according to the bounding box coordinates.

In an example embodiment of the current technique, the website page density and readability system analyzes the image to identify the graphic content of the website page.

In an example embodiment of the current technique, the website page density and readability system identifies each of a plurality of graphics rendered in the image.

In an example embodiment of the current technique, for each of the plurality of graphics rendered in the image, the website page density and readability system obtains bounding box coordinates associated with each graphic, calculates an area associated with the bounding box, and adds the area to a total graphic area associated with the image to obtain the graphic density.

In an example embodiment of the current technique, prior to the analyzing, the website page density and readability system removes the text content from the website page.

In an example embodiment of the current technique, prior to the analyzing, the website page density and readability system removes background content associated with the website page, where the background content is not associated with the text content or the graphic content.

In an example embodiment of the current technique, the website page density and readability system sums a total word area and a total graphic area and divides by a website page total area.

In an example embodiment of the current technique, the website page density and readability system associates website page analytics with the readability score to determine if the website page requires modification.

In an example embodiment of the current technique, the website page density and readability system provides at least one recommendation for modifying the website page to improve the readability score.

In an example embodiment of the current technique, the website page density and readability system provides at least one recommendation for modifying the website page to improve the readability score based on a suggested audience of the website page.

In an example embodiment of the current technique, the website page density and readability system recommends modifying at least one graphic on the website page.

In an example embodiment of the current technique, the website page density and readability system provides at least a portion of suggested text with which to replace existing text on the website page.

In an example embodiment of the current technique, the website page density and readability system provides at least a portion of suggested text based on the suggested audience.

In an example embodiment of the current technique, the website page density and readability system receives approval of at least a portion of the suggested text from a user, and replaces the existing text with at least a portion of the suggested text.

In an example embodiment of the current technique, the website page density and readability system maintains a list of words that should not be replaced, where the existing text comprises at least one word in the list of words.

In an example embodiment of the current technique, the website page density and readability system predicts an updated readability score based on at least one recommendation.

In an example embodiment of the current technique, the website page density and readability system determines a readability score associated with each of a plurality of website pages, and provides recommendations to modify at least one of the plurality of website pages to achieve a consistent readability score across the plurality of website pages.

In an example embodiment of the current technique, the website page density and readability system establishes a zoom threshold within a browser in which the website page is rendered, where exceeding the zoom threshold negatively impacts the reading score, and notifies a user when the zoom threshold in the browser is exceeded, the notification indicating user experience may be impacted based on a selected zoom level within the browser.

In an example embodiment of the current technique, the website page density and readability system determines a text density associated with the website page, removes the text content from the website page, determines a graphical density associated with the website page, and determines the website page density using the text density and the graphical density.

In an example embodiment of the current technique, the website page density and readability system determines a number of words in the image, determines a number of syllables per word, and calculates the readability score based on at least one of the number of words in the image, a number of words in the image having at least three syllables; and the website page density.

In an example embodiment of the current technique, the website page density and readability system multiplies i) the number of words in the image by ii) the number of words in the image having at least three syllables by iii) the website page density, and takes the square root of the multiplication.

FIG. 1 shows a computer network (also referred to herein as an information processing system) 100 configured in accordance with an illustrative embodiment. The computer network 100 comprises a user computing device 101 comprising a web browser 103, website page density and readability system 105, and computing devices 102-N. The user computing device 101, website page density and readability system 105, and computing devices 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. The website page density and readability system 105 may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the user computing device 101 and computing device 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user computing device 101 and computing device 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX™ network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the website page density and readability system 105 are one or more input-output devices, which illustratively comprise keyboards, displays or other types of input-output devices in any combination. Such input-output devices can be used, for example, to support one or more user interfaces to the website page density and readability system 105, as well as to support communication between the website page density and readability system 105 and other related systems and devices not explicitly shown. For example, a dashboard may be provided for a user to view results produced by the website page density and readability system 105. One or more input-output devices may also be associated with any of the user computing device 101 and computing device 102-N.

Additionally, the website page density and readability system 105 in the FIG. 1 embodiment is assumed to be implemented using at least one processing device. Each such processing device generally comprises at least one processor and an associated memory, and implements one or more functional modules for controlling certain features of the website page density and readability system 105.

More particularly, the website page density and readability system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the website page density and readability system 105 to communicate over the network 104 with the user computing device 101 and computing device 102-N and illustratively comprises one or more conventional transceivers.

A website page density and readability system 105 may be implemented at least in part in the form of software that is stored in memory and executed by a processor, and may reside in any processing device. The website page density and readability system 105 may be a standalone plugin that may be included within a processing device.

It is to be understood that the particular set of elements shown in FIG. 1 for website page density and readability system 105 involving the user computing device 101 and computing device 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the website page density and readability system 105 can be on and/or part of the same processing platform.

An exemplary process of website page density and readability system 105 in computer network 100 will be described in more detail with reference to, for example, the flow diagram of FIG. 2.

Figure 2:
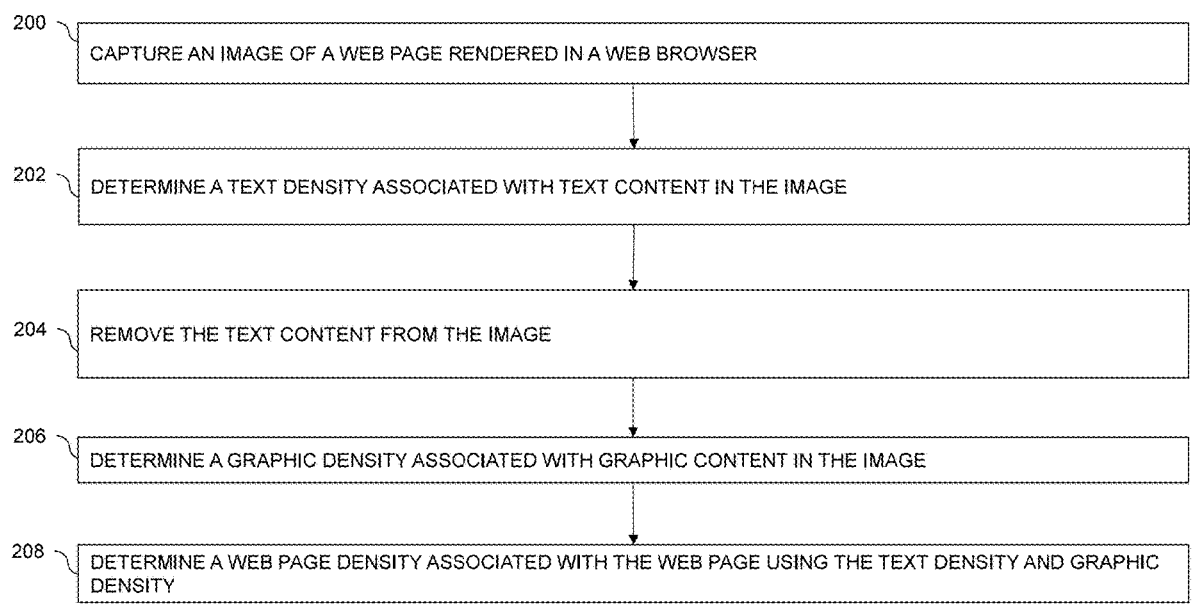
FIG. 2 shows a flow diagram of a process for a website page density and readability system in an illustrative embodiment.

FIG. 2 is a flow diagram of a process for execution of the website page density and readability system 105 in an illustrative embodiment. It is to be understood that this particular process is only an example, and additional or alternative processes can be carried out in other embodiments.

Figure 3:
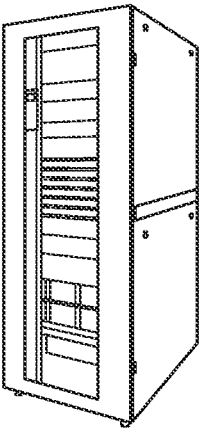
FIG. 3 shows an example website page rendered within a web browser in an illustrative embodiment.

At 200, the website page density and readability system 105 captures an image of a website page rendered in a web browser. In an example embodiment, a user may invoke the website page density and readability system 105 to analyze a website page that is rendered within the web browser. FIG. 3 illustrates an example website page rendered within a web browser 103. In an example embodiment, the website page density and readability system 105 captures the website page as a bitmap image.

Figure 4:
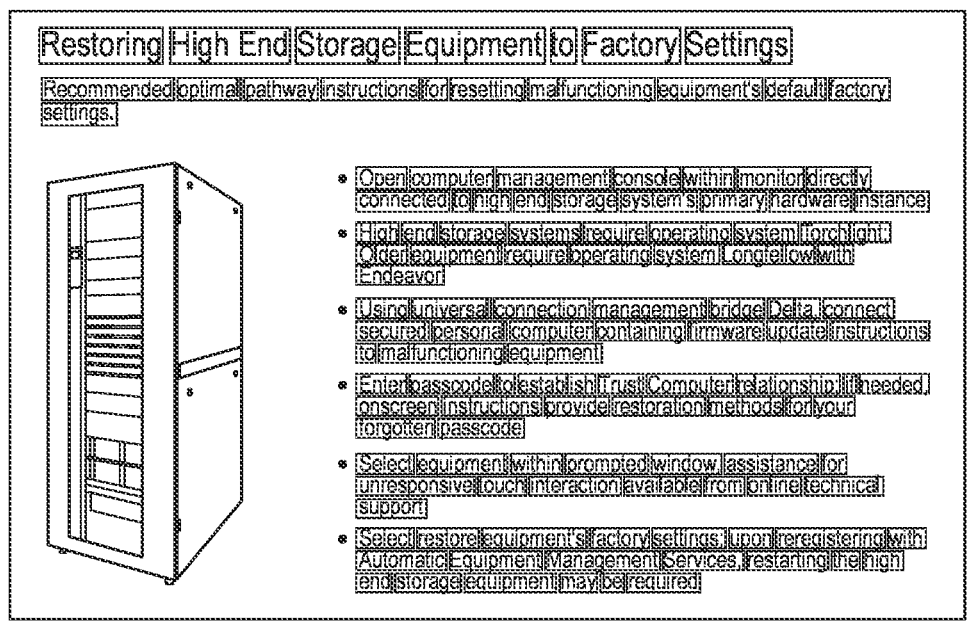
FIG. 4 shows an example website page with text content identified in an illustrative embodiment.

At 202, the website page density and readability system 105 determines a text density associated with text content in the image. In an example embodiment, the website page density and readability system 105 analyzes the image to identify the text content of the website page. For example, the website page density and readability system 105 identifies the text content of the website pages as illustrated in FIG. 4. In an example embodiment, the website page density and readability system 105 identifies each of a plurality of words rendered in the image. In an example embodiment, the website page density and readability system 105 determines a bounding box associated with each word as illustrated in FIG. 4. For example, the website page density and readability system 105 may identify the text content on the image using PyTesseract, a Python™ Optical Character Recognition (OCR) tool that can read and recognized text in images. In an example embodiment, the website page density and readability system 105 also calculates an area associated with the bounding box (i.e., the bounding box associated with each word) and adds the area to a total word area associated with the image to obtain the text density. In other words, with the text identified, the area covered by text is calculated by summing the bounding boxes of each word.

Figure 5:
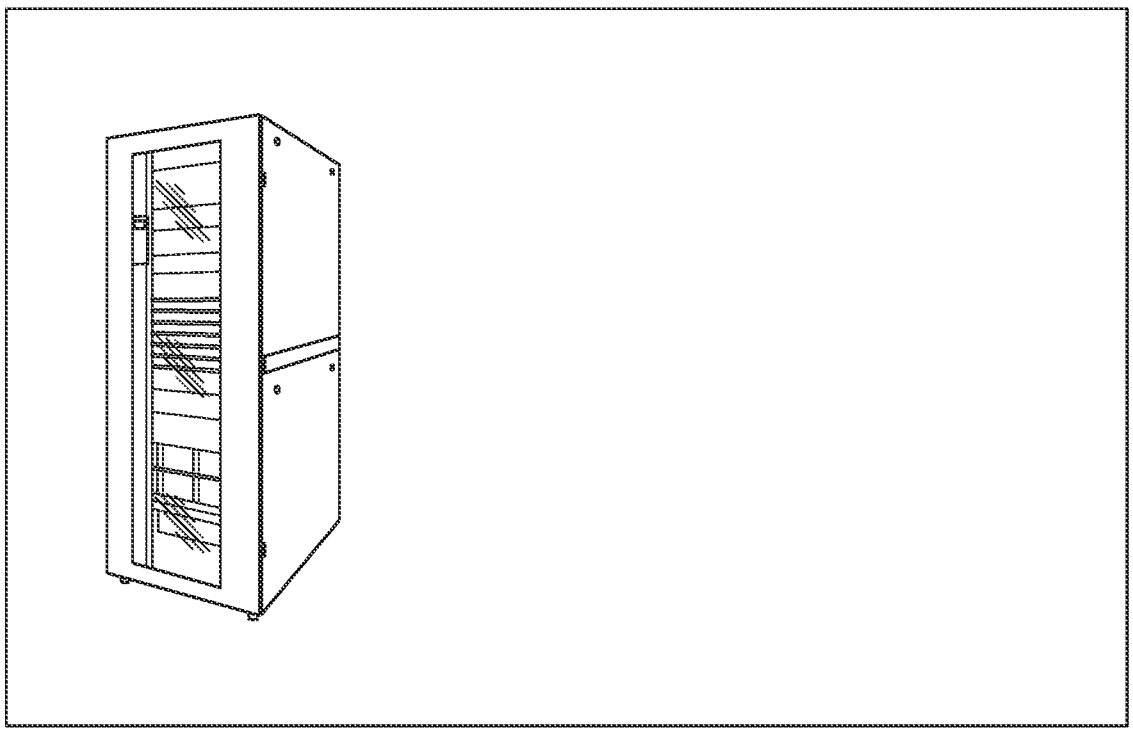
FIG. 5 shows an example website page with the text content removed in an illustrative embodiment.

At 204, the website page density and readability system 105 removes the text content from the image. In an example embodiment, the text content is removed from the image, and the graphic content remains in the image as illustrated in FIG. 5. In an example embodiment, for each of a plurality of words rendered in the image, the website page density and readability system 105 obtains bounding box coordinates associated with each word, and renders a background color on the image according to the bounding box coordinates. In other words, after the text content has been identified, it is "removed" from the image by filling in the area defined by the textual bounding boxes with, for example, white.

At 206, the website page density and readability system 105 determines a graphic density associated with graphic content in the image. In an example embodiment, the website page density and readability system 105 analyzes the image to identify the graphic content of the website page. For example, after the website page density and readability system 105 removes the text content from the image, the resulting image is scanned for graphical elements, for example, using CV2, the module import name for opencv-python, an open-source library that can be used to perform tasks such as facial detection, objection tracking, landmark detection, etc.

In an example embodiment, the website page density and readability system 105 removes the text content from the image prior to analyzing the image to identify the graphic content. In another example embodiment, the website page density and readability system 105 removes the background content, if removal is needed, prior to analyzing the image to identify the graphic content. The background content, for example, may be image content that is not associated with the text content or the graphic content, such as website page headers, footers, banners, etc. FIG. 3 illustrates an example image with a banner and footer while FIG. 4 illustrates the same image with the banner and footer removed.

Figure 6:
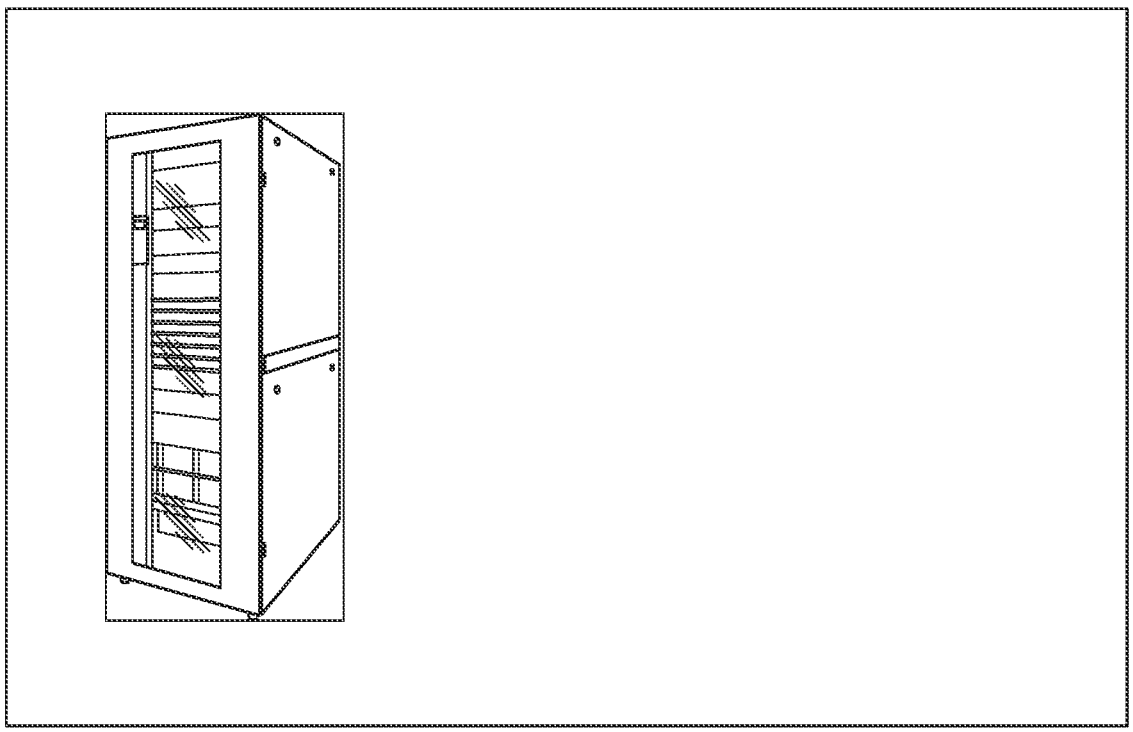
FIG. 6 shows an example website page with graphic content identified in an illustrative embodiment.

In an example embodiment, the website page density and readability system 105 identifies each of a plurality of graphics rendered in the image. In an example embodiment, for each for each of the plurality of graphics rendered in the image, the website page density and readability system 105 obtains bounding box coordinates associated with each graphic. FIG. 6 illustrates the image with a bounding box around each of the remaining graphics in the image. For each of the graphics in the image, the website page density and readability system 105 calculates an area associated with the bounding box, and adds the area to a total graphic area associated with the image to obtain the graphic density. In other words, just as with calculating the area of the text content, the website page density and readability system 105 calculates the area of the graphical content by summing the bounding boxes of all the graphics found in the image.

At 208, the website page density and readability system 105 determines a website page density associated with the website page using the text density and graphic density. In an example embodiment, a script, such as a Python™ script, is created to automate the process of calculating the area covered by textual and graphical elements in the image of the website page. In an example embodiment, the website page density and readability system 105 determines the website page density by summing the total word area and the total graphic area and dividing by the website page total area.

In an example embodiment, the website page density and readability system 105 receives the image of the website page as an input to the website page density and readability system 105, and renders, as output of the website page density and readability system 105, a display comprising a readability score associated with the website page, based on the website page density. In an example embodiment, the display may be rendered on a dashboard for the user. The readability score is calculated by measuring the ratio of the image that is covered by textual elements and graphical elements (i.e., the total text area covered by text, plus the total graphical area covered by graphics, divided by total area of the image, as determined by the height and width of the image), as well as the total number of words, and the number of words that are three or more syllables in length.

FIG. 7 illustrates an example output of the website page density and readability system 105. In an example embodiment, a script executes that receives, as input, the image of the website page, and outputs a display comprising the following information:

Original Image
  Height
  Width
  Total Area
Words
  Total number found
  Number of words with three or more syllables
  Total syllables in all words
  Average number of syllables per word
Graphics
  Total number found
Coverage
  Text area in square pixels and percent of total area
  Graphical area in square pixels and percent of total area
  Ratio of text area to graphical area
Score
  Readability Score In an example embodiment, the website page density and readability system 105 determines a number of words in the image and determines a number of syllables per word. For example, a script that automates the process of calculating the area covered by textual and graphical elements may contain a function that calculates the number of syllables per word. The website page density and readability system 105 calculates the readability score based on at least one of the number of words in the image, a number of words in the image having at least three syllables; and the website page density. In an example embodiment, the website page density and readability system 105 calculates the readability score by multiplying the number of words in the image by the number of words in the image having at least three syllables by the website page density, and then taking the square root of the three multiplied variables. In other words, the readability score is calculated using three variable that are computed from the image. The first variable is the total number of words in the image (i.e., on the website page). The total number of words is the total count of the words on the website page. The second variable is the density of text content and graphical content in the image (i.e., on the website page). The density is the ratio of the sum of area covered by the text content and the area of the graphical content, divided by the total area of the website page. The third variable is the number of words in the image (i.e., on the website page) that have three or more syllables. The three variables are multiplied together, and the square root of that calculation is computed. The higher the readability score, the more "readable" the website page.

Using FIG. 3 as an example, the website page density and readability system 105 calculates the number of words on the website page. In this example embodiment, there are 131 words, and of those 131 words, 57 words have three syllables or more. The overall dimensions of the website page is 1484 px×1067 px (where px is pixels), for a total area of 1,583,428 px$^2$. The area covered by text elements is 180,424 px$^2$, and the area covered by graphical elements is 177,728 px$^2$. Density is then calculated by the following.

Density=(Text Area+Graphical Area)/Total Area

Density=(180,424+177,728)/1,583,428=0.226

With values for the total number of words (131), number of words with three or more syllables (57), and the density of text and graphics (0.226), the readability score can now be calculated. The readability score is the square root of the total words×density×words having three or more syllables. The total words (131)×density (0.226)×words having three or more syllables (57) equals 1,687.542. The square root of 1,687.542 equals 41.08. The readability score returns a value that can be used for comparison and evaluation against other website pages.

In an example embodiment, the website page density and readability system 105 tunes the readability score by modifying at least one of the text content and the graphic content on the website page. In an example embodiment, the readability score may be used, for example, to provide feedback to a website page designer, compare two website pages, become an input variable to a larger feedback mechanism, etc. FIG. 8 and FIG. 9 illustrates how the readability score may be tuned by modifying text content and/or graphic content on the website page. The content is the same in both figures, but the font in FIG. 9 is larger, and FIG. 9 has a different layout than FIG. 8. The readability score for FIG. 8 is 28.89 while the readability score for FIG. 9 is 32.25. In an example embodiment, the readability score provides a way to measure the relative reading-ease between two website pages. In an example embodiment, the three variables used to compute the readability score may be used to provide insight as to why one website page is scoring higher than another website page. For example, if two website pages are being compared, the number of words, the number of 3+ syllable words, and the density may be analyzed to determine why one website page scored higher than the other. More specifically, if the two website pages have a comparable number of total words, and a similar number of 3+ syllable words, but the density of one website page is 0.20 while the density of the second website page is 0.40, then the website page density and readability system 105 provides valuable information to increase the amount "white space" on the second website page so as to decrease the density and increase the readability score. In an example embodiment, a website page designer could apply the readability score to a newly designed website page to evaluate the website page. In another example embodiment, standards may be established for different types of website pages, for example, a knowledge base article on a support website page should target a certain readability score range, while a product description website page within sales may have a different readability range. In another example embodiment, an online journal may have a standard that the readability score of content must be below a threshold. In yet another example embodiment, standards may be set depending on the audience so as to make the website pages accessible for different audiences (i.e., age appropriate for the audience, reading level appropriate for the audience, accessible for visually impaired, etc.).

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

FIG. 3 illustrates an example website page saved as an image. For example, a screenshot may be taken of the website page to save it as an image. In an example embodiment, a script on the website page density and readability system 105 may be invoked that captures the height and width measurements of the image.

FIG. 4 illustrates an example website page with text content identified and displayed with bounding blocks. In an example embodiment, a script on the website page density and readability system 105 executes a loop that finds each word within the image, maintains a word list comprising each detected word, obtains the bounding box area for each word, adds that bounding box area to the total text content area, and checks to see if any words remain in the image (i.e., if any words remain in the word list) that haven't been added to the total text content area. FIG. 4 also illustrates the background content as shown in FIG. 3 removed. The background content, for example, may be image content that is not associated with the text content or the graphic content, such as website page headers, footers, banners, etc.

FIG. 5 illustrates an example website page with the text content identified and displayed with bounding blocks as show in FIG. 4 removed from the example website page. As noted above in FIG. 4, the website page density and readability system 105 calculates the total text content area. Once the individual text content areas in the image have been added to the total text content area, the website page density and readability system 105 resets the word list. The website page density and readability system 105 then removes the text content by executing a script that loops through the (now reset) word list, and for each word, obtains the bounding box coordinates, and fills in the bounding box, for example, with white (or whichever background color removes the text from the image) to remove the text from the image. Once there are no more words in the word list that have to be removed from the image, the script moves on to finding all the graphic content in the image as illustrated in FIG. 6.

FIG. 6 illustrates an example website page with graphic content identified and displayed with bounding blocks. For each graphical content that the website page density and readability system 105 identifies in the image, the website page density and readability system 105 executes a script that obtains the bounding box area for each graphic, and adds that graphic area to the total graphical area. Once this is completed, the script moves on to creating the output of the website page density and readability system 105 as illustrated in FIG. 7.

FIG. 7 illustrates an example output of the website page density and readability system as the final output of a script that executes on the website page density and readability system 105. In an example embodiment, a script on the website page density and readability system 105 executes to create the output of the website page density and readability system 105, and displays the results.

FIGS. 8 and 9 illustrate how the same content on a website page can result in different readability score due to the size of font and the page's layout. The readability score for FIG. 8 is 28.89, while the readability score for FIG. 9 is 32.25.

Figure 10:
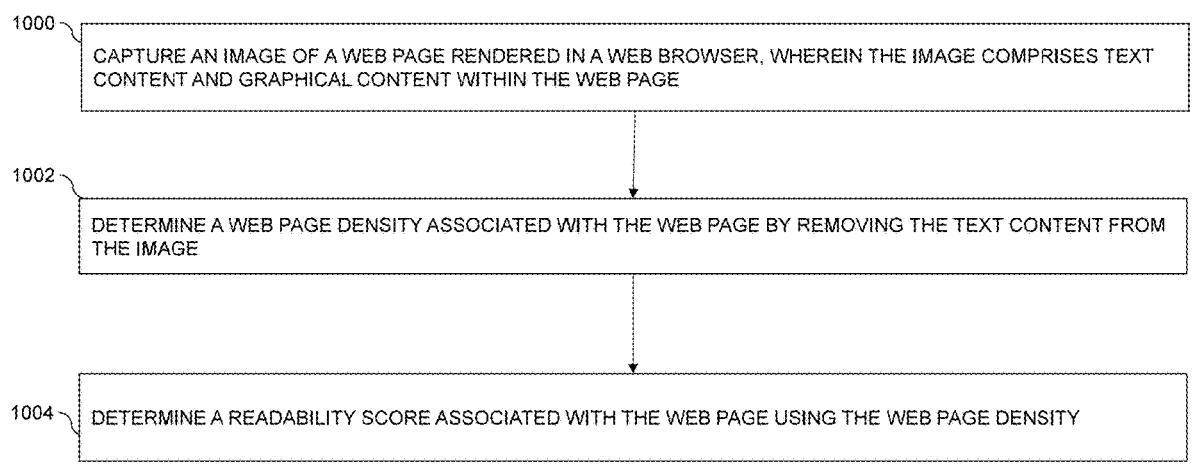
FIG. 10 shows a flow diagram of a process for a website page density and readability system that determines a readability score in an illustrative embodiment.

FIG. 10 is a flow diagram of a process for execution of the website page density and readability system 105 that determines a readability score in an illustrative embodiment. It is to be understood that this particular process is only an example, and additional or alternative processes can be carried out in other embodiments.

At 1000, the website page density and readability system 105 captures an image of a website page rendered in a web browser, where the image comprises text content and graphical content within the website page. In an example embodiment, a user may invoke the website page density and readability system 105 to analyze a website page that is rendered within the web browser. FIG. 3 illustrates an example website page rendered within a web browser 103. In an example embodiment, the website page density and readability system 105 captures the website page as a bitmap image.

At 1002, the website page density and readability system 105 determines a website page density associated with the website page by removing the text content from the image. In an example embodiment, the website page density and readability system 105 determines a text density associated with text content in the image. In an example embodiment, the website page density and readability system 105 analyzes the image to identify the text content of the website page. For example, the website page density and readability system 105 identifies the text content of the website pages as illustrated in FIG. 4. In an example embodiment, the website page density and readability system 105 identifies each of a plurality of words rendered in the image. In an example embodiment, the website page density and readability system 105 determines a bounding box associated with each word as illustrated in FIG. 4.

For example, the website page density and readability system 105 may identify the text content on the image using PyTesseract, a Python™ Optical Character Recognition (OCR) tool that can read and recognized text in images. In an example embodiment, the website page density and readability system 105 also calculates an area associated with the bounding box (i.e., the bounding box associated with each word) and adds the area to a total word area associated with the image to obtain the text density. In other words, with the text identified, the area covered by text is calculated by summing the bounding boxes of each word.

In an example embodiment, the text content is removed from the image, and the graphic content remains in the image as illustrated in FIG. 5. In an example embodiment, for each of a plurality of words rendered in the image, the website page density and readability system 105 obtains bounding box coordinates associated with each word, and renders a background color on the image according to the bounding box coordinates. In other words, after the text content has been identified, it is "removed" from the image by filling in the defined textual bounding boxes with, for example, white, or whatever the background color of the website page is, so as to remove the text from the image. In an example embodiment, the website page density and readability system 105 replaces the area within the bounding box coordinates with white, pixel by pixel.

In an example embodiment, the website page density and readability system 105 identifies each of a plurality of graphics rendered in the image. In an example embodiment, for each for each of the plurality of graphics rendered in the image, the website page density and readability system 105 obtains bounding box coordinates associated with each graphic. FIG. 6 illustrates the image with a bounding box around each of the remaining graphics in the image. For each of the graphics in the image, the website page density and readability system 105 calculates an area associated with the bounding box, and adds the area to a total graphic area associated with the image to obtain the graphic density. In other words, just as with calculating the area of the text content, the website page density and readability system 105 calculates the area of the graphical content by summing the bounding boxes of all the graphics found in the image.

In an example embodiment, the website page density and readability system 105 determines a website page density associated with the website page using the text density and graphic density. In an example embodiment, a script, such as a Python™ script, is created to automate the process of calculating the area covered by textual and graphical elements in the image of the website page. In an example embodiment, the website page density and readability system 105 determines the website page density by summing the total word area and the total graphic area and dividing by the website page total area.

At 1004, the website page density and readability system 105 determines a readability score associated with the website page using the website page density. The readability score is calculated by measuring the ratio of the image that is covered by textual elements and graphical elements (i.e., the total text area covered by text, plus the total graphical area covered by graphics, divided by total area of the image, as determined by the height and width of the image), as well as the total number of words, and the number of words that are three or more syllables in length. In an example embodiment, the website page density and readability system 105 determines a number of words in the image, and then determines a number of syllables per word. For example, a script that automates the process of calculating the area covered by textual and graphical elements may contain a function that calculates the number of syllables per word. In an example embodiment, the website page density and readability system 105 calculates the readability score by multiplying the number of words in the image by the number of words in the image having at least three syllables by the website page density, and then taking the square root of the three multiplied variables. In other words, the readability score is calculated using three variable that are computed from the image. The first variable is the total number of words in the image (i.e., on the website page). The total number of words is the total count of the words on the website page. The second variable is the density of text content and graphical content in the image (i.e., on the website page). The density is the ratio of the sum of area covered by the text content and the area of the graphical content, divided by the total area of the website page. The third variable is the number of words in the image (i.e., on the website page) that have three or more syllables. The three variables are multiplied together, and the square root of that calculation is computed. The higher the readability score, the more "readable" the website page.

In an example embodiment, the website page density and readability system 105 associates website page analytics with the readability score to determine if the website page requires modification. In an example embodiment, the website page density and readability system 105 collects website page analytics, and correlates the website page analytics with the readability score to determine if the website page requires modification. The determination may be based on established, external, thresholds. For example, the website page analytics may reveal that visitors to the web site leave the web site after visiting one or two pages.

In an example embodiment, the website page density and readability system 105 provides at least one recommendation for modifying the website page to improve the readability score. In an example embodiment, the recommendation for modifying the website page to improve the readability score is based on a suggested audience of the website page. For example, for the same website page content, there may be one recommended readability score for content presented to an audience of middle school students, another recommended readability score for high school students, and yet another recommended readability score for university students.

In an example embodiment, the website page density and readability system 105 recommends modifying at least one graphic on the website page. For example, reducing the size of a graphic on the page may create a better user experience without negatively impacting the readability score. In another example embodiment, the website page density and readability system 105 may recommend adding graphic content to make the content of the website page easier to comprehend. For example, a graphic may be necessary to aid a high school audience in comprehending the content, where the graphic might not be necessary for a college audience. In this example embodiment, the graphic may be added to the website page for the high school audience, and the readability score recalculated to verify that the readability score is improving and/or meets a threshold.

In an example embodiment, the website page density and readability system 105 provides at least a portion of suggested text with which to replace existing text on the website page. For example, a pop-up window may appear that suggests replacing words within the text content with suggested text. In an example embodiment, the website page density and readability system 105 provides a portion of the suggested text based on the suggested audience. For example, the website page density and readability system 105 may suggest replacing the word "obsequious" with "fawning" or "submissive", based on the audience (for example, younger students) who might not be conversant in such an uncommon and unfamiliar word.

In an example embodiment, the website page density and readability system 105 receives approval of at least a portion of the suggested text from a user. For example, the user may approve the suggested text via a pop-up window. The user may also reject the suggested replacement text. In an example embodiment, the website page density and readability system 105 replaces the existing text with at least a portion of the suggested text.

In an example embodiment, the website page density and readability system 105 maintains a list of words that should not be replaced, where the existing text comprises at least one word in the list of words. In other words, the website page density and readability system 105 maintains a list of words for which the website page density and readability system 105 should not suggest replacing. The list of words comprises words that should not or cannot be substituted within the content of the website page.

In an example embodiment, the website page density and readability system 105 predicts an updated readability score based on the recommendation to modify the website page. In an example embodiment, after the website page is modified, the website page density and readability system 105 may iteratively collect the website page analytics and correlate them with the readability score to tune the website page. In other words, the website page density and readability system 105 may automate the analysis of the website page, automatically tweak the website page, and create a feedback loop to tune the website page.

In an example embodiment, the website page density and readability system 105 determines a readability score associated with each of a plurality of website pages. In an example embodiment, a web site may have a plurality of pages that are related; for example, a topic is covered over multiple pages, or multiple website pages may have links that connect the multiple website pages, etc. In this example embodiment, the website page density and readability system 105 determines a readability score for each of the plurality of website pages. In an example embodiment, the website page density and readability system 105 provides recommendations to modify at least one of the plurality of website pages to achieve a consistent readability score across the plurality of website pages. In other words, the website page density and readability system 105 recommends modifying the content so that there's consistent readability across the plurality of website pages. In another example embodiment, the website page density and readability system 105 may recommend modifying the content so that a particular readability score is achieved across the plurality of website pages, for example, based on the audience for which the plurality of website pages is intended (for example, based on different reading levels associated with different audiences).

In an example embodiment, the website page density and readability system 105 establishes a zoom threshold within a browser in which the website page is rendered, where exceeding the zoom threshold negatively impacts the reading score. In an example embodiment, if a user modifies the website pages viewed in the browser by changing the zoom of the website page, the website page density and readability system 105 notifies the user when the zoom threshold in the browser is exceeded. In this example, embodiment the notification indicates that the user experience may be impacted based on a selected zoom level within the browser. In other words, the website page density and readability system 105 notifies the user the extent to which accessibility changes to the website page will affect the readability (i.e., the readability score) of the website page. In another example, embodiment, the website page density and readability system 105 provides this notification to authors/content creators as the website pages are being created so that the author can see how the user/viewer changes might impact the readability of the website page.

The above-described illustrative embodiments provide significant advantages relative to conventional approaches. For example, some embodiments are configured to significantly improve website page readability by providing a website page density and readability system that can determine the website page density and readability score. These and other embodiments can effectively improve the experience of users viewing a web site and reach an end goal of presenting the optimal website page and web site to the customer. Embodiments disclosed herein determine a website page density that provides consistent results and avoids the problems with subjectivity regarding graphical elements on the website page. Embodiments disclosed herein provide a readability score that is not subject to the same types of prerequisites or limitations of other readability scores, such as a 100-word minimum word length. Embodiments disclosed herein provide a readability score that takes into account on-page attributes such as website page density. Embodiments disclosed here provide a readability score that avoids erroneous results produced by traditional print medium readability metrics applied to online mediums.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker™ container or other type of Linux™ Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. Although described in the context of the information processing system 100, these platforms may also be used to implement at least portions of other information processing systems in other embodiments.

Figure 11:
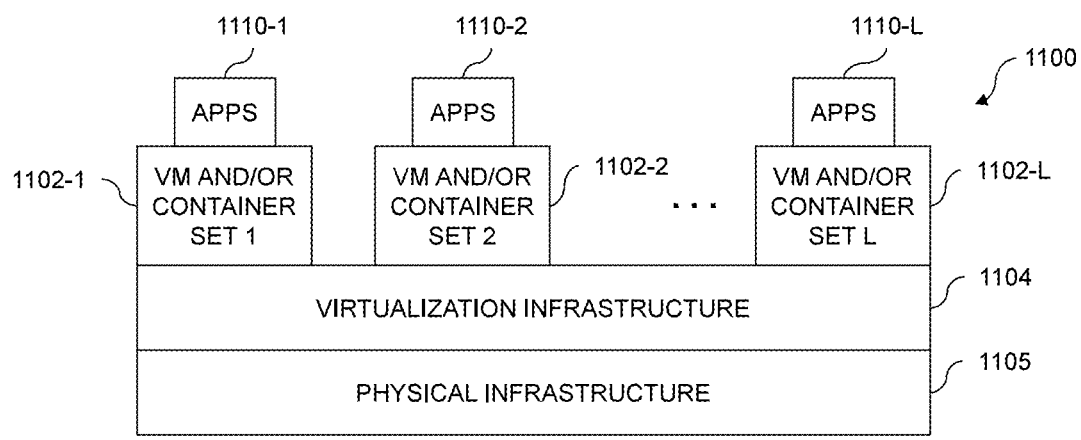
FIGS. 11 and 12 show examples of processing platforms that may be utilized to implement at least a portion of a website page density and readability system embodiments.
Figure 12:
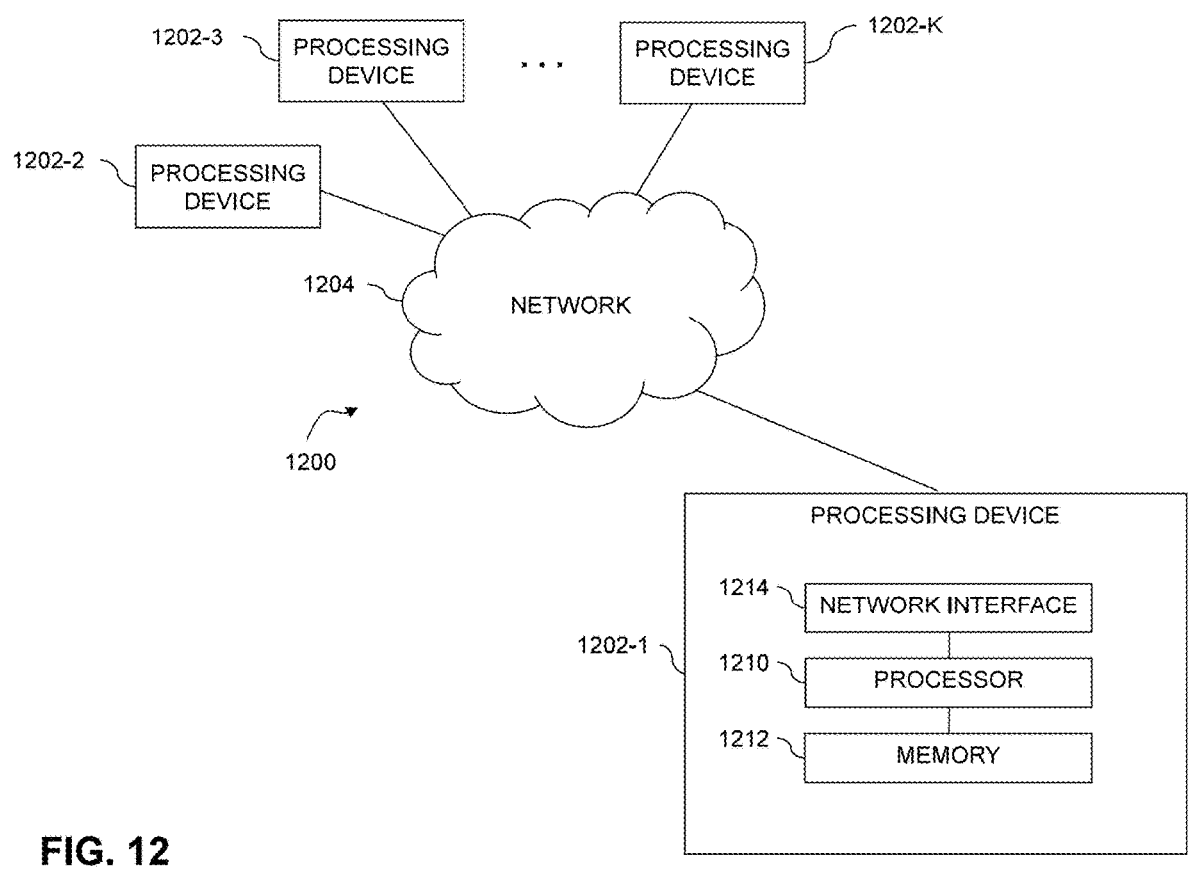

FIG. 11 shows an example processing platform comprising cloud infrastructure 1100. The cloud infrastructure 1100 comprises a combination of physical and virtual processing resources that are utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux™ operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 comprise respective VMs, respective sets of one or more containers, or respective sets of one or more containers running in VMs. In some implementations of the FIG. 11 embodiment, the VMs/container sets 1102 comprise respective VMs implemented using virtualization infrastructure 1104 that comprises at least one hypervisor.

A hypervisor platform may be used to implement a hypervisor within the virtualization infrastructure 1104, where the hypervisor platform has an associated virtual infrastructure management system. The underlying physical machines comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker IM containers running on bare metal hosts, or Docker™ containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of the information processing system 100 and includes a plurality of processing devices, denoted 1202-1, 1202-2, 1202-3, . . . 1202-K, which communicate with one another over a network 1204.

The network 1204 comprises any type of network, including by way of example a global computer network such as the Internet, a WAN, a LAN, a satellite network, a telephone or cable network, a cellular network, a wireless network such as a Wi-Fi or WiMAX™ network, or various portions or combinations of these and other types of networks.

The processing device 1202-1 in the processing platform 1200 comprises a processor 1210 coupled to a memory 1212.

The processor 1210 comprises a microprocessor, a microcontroller, an application-specific integrated circuit (ASIC), a field-programmable gate array (FPGA) or other type of processing circuitry, as well as portions or combinations of such circuitry elements.

The memory 1212 comprises random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker™ containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
capturing an image of a web page rendered in a web browser, wherein the image comprises text content and graphical content within the web page;
determining a web page density associated with the web page by removing the text content from the image, wherein the web page density is determined using a total graphic area calculated after the removing the text content from the image; and
determining a readability score associated with the web page using the web page density, wherein the method is implemented by at least one processing device comprising a processor coupled to a memory.

2. The method of claim 1 further comprising:
associating web page analytics with the readability score to determine if the web page requires modification.

3. The method of claim 1 further comprising:
providing, by a web page density and readability system, at least one recommendation for modifying the web page to improve the readability score.

4. The method of claim 3 further comprising:
providing, by the web page density and readability system, at least one recommendation for modifying the web page to improve the readability score based on a suggested audience of the web page.

5. The method of claim 3 wherein providing, by the web page density and readability system, the at least one recommendation comprises:
recommending modifying at least one graphic on the web page.

6. The method of claim 3 wherein providing, by the web page density and readability system, the at least one recommendation comprises:
providing at least a portion of suggested text with which to replace existing text on the web page.

7. The method of claim 6 wherein providing the at least a portion of suggested text comprises:
providing the at least a portion of suggested text based on a suggested audience.

8. The method of claim 6 further comprising:
receiving approval of the at least a portion of the suggested text from a user; and
replacing the existing text with the at least a portion of the suggested text.

9. The method of claim 6 wherein providing the at least a portion of suggested text with which to replace existing text on the web page comprises:
maintaining a list of words that should not be replaced, wherein the existing text comprises at least one word in the list of words.

10. The method of claim 3 further comprising:
predicting an updated readability score based on the at least one recommendation.

11. The method of claim 1 further comprising:
determining a respective readability score associated with each of a plurality of web pages; and
providing recommendations to modify at least one of the plurality of web pages to achieve a consistent readability score across the plurality of web pages.

12. The method of claim 1 further comprising:
establishing a zoom threshold within a browser in which the web page is rendered, wherein exceeding the zoom threshold negatively impacts the reading score; and
notifying a user when the zoom threshold in the browser is exceeded, the notification indicating user experience may be impacted based on a selected zoom level within the browser.

13. The method of claim 1 wherein determining the web page density associated with the web page by removing the textual content from the image comprises:
determining a text density associated with the web page;
removing the text content from the web page;
determining a graphical density associated with the web page; and
determining the web page density using the text density and the graphical density.

14. The method of claim 1 wherein determining the readability score comprises:
determining a number of words in the image;
determining a number of syllables per each word in the number of words; and
calculating the readability score based on at least one of the number of words in the image, a number of words in the image having at least three syllables; and the web page density.

15. The method of claim 14 further comprising:
multiplying i) the number of words in the image by ii) the number of words in the image having at least three syllables by iii) the web page density; and
taking the square root of the multiplication.

16. A system comprising:
at least one processing device comprising a processor coupled to a memory;
the at least one processing device being configured:
to capture an image of a web page rendered in a web browser, wherein the image comprises text content and graphical content within the web page;
to determine a web page density associated with the web page by removing the text content from the image, wherein the web page density is determined using a total graphic area calculated after the removing the text content from the image; and
to determine a readability score associated with the web page using the web page density.

17. The system of claim 16 further configured to:
determine a number of words in the image;
determine a number of syllables per each word in the number of words; and
calculate the readability score based on at least one of the number of words in the image, a number of words in the image having at least three syllables; and the web page density.

18. The system of claim 17 further configured to:
multiply i) the number of words in the image by ii) the number of words in the image having at least three syllables by iii) the web page density; and
take the square root of the multiplication.

19. A computer program product comprising a non-transitory processor-readable storage medium having stored therein program code of one or more software programs, wherein the program code when executed by at least one processing device causes said at least one processing device:
to capture an image of a web page rendered in a web browser, wherein the image comprises text content and graphical content within the web page;
to determine a web page density associated with the web page by removing the text content from the image, wherein the web page density is determined using a total graphic area calculated after the removing the text content from the image; and
to determine a readability score associated with the web page using the web page density.

20. The computer program product of claim 19, wherein the program code is further configured to:
determine a number of words in the image;
determine a number of syllables per each word in the number of words;
calculate the readability score based on at least one of the number of words in the image, a number of words in the image having at least three syllables; and the web page density;
multiply i) the number of words in the image by ii) the number of words in the image having at least three syllables by iii) the web page density; and
take the square root of the multiplication.

* * * * *